United States Patent
Todd et al.

(10) Patent No.: US 10,296,501 B1
(45) Date of Patent: May 21, 2019

(54) LINEAGE-BASED VERACITY FOR DATA REPOSITORIES

(71) Applicant: EMC Corporation, Hopkinton, MA (US)

(72) Inventors: Stephen Todd, Shrewsbury, MA (US); Nikhil Sharma, El Dorado Hills, CA (US); Said Tabet, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 459 days.

(21) Appl. No.: 14/674,121

(22) Filed: Mar. 31, 2015

(51) Int. Cl.
*G06F 17/30* (2006.01)
*G06F 16/23* (2019.01)
*G06F 16/215* (2019.01)
*G06F 16/2457* (2019.01)

(52) U.S. Cl.
CPC ........ *G06F 16/2365* (2019.01); *G06F 16/215* (2019.01); *G06F 16/24578* (2019.01); *G06F 17/3053* (2013.01); *G06F 17/30303* (2013.01); *G06F 17/30371* (2013.01)

(58) Field of Classification Search
CPC ................................................. G06F 17/30371
USPC ........................................................ 707/713
See application file for complete search history.

(56) References Cited

U.S. PATENT DOCUMENTS

| | | | |
|---|---|---|---|
| 7,343,601 B2 | 3/2008 | Azagury et al. | |
| 7,752,437 B1 | 7/2010 | Thakur et al. | |
| 8,010,426 B2 | 8/2011 | Kopp et al. | |
| 8,671,449 B1 | 3/2014 | Nachenberg | |
| 8,706,692 B1 | 4/2014 | Luthra et al. | |
| 8,756,656 B1 | 6/2014 | Hartmann | |
| 8,904,299 B1 | 12/2014 | Owen et al. | |
| 8,972,564 B1 | 3/2015 | Allen | |
| 9,256,656 B2 | 2/2016 | Frankhauser et al. | |
| 2004/0243692 A1 | 12/2004 | Arnold et al. | |
| 2005/0108703 A1 | 5/2005 | Hellier | |
| 2008/0091747 A1 | 4/2008 | Prahlad et al. | |
| 2008/0104060 A1* | 5/2008 | Abhyankar | G06F 17/30643 |
| 2008/0107037 A1 | 5/2008 | Forbes et al. | |
| 2008/0134332 A1 | 6/2008 | Keane et al. | |
| 2010/0076987 A1 | 3/2010 | Schreiner | |

(Continued)

OTHER PUBLICATIONS

U.S. Appl. No. 14/610,191, filed in the name of Stephen Todd et al. on Jan. 30, 2015 and entitled "Governed Application Deployment on Trusted Infrastructure."

(Continued)

*Primary Examiner* — Syling Yen
(74) *Attorney, Agent, or Firm* — Ryan, Mason & Lewis, LLP (57) ABSTRACT

Techniques for determining and representing the veracity of data stored in a data repository and results of queries directed to the stored data by utilizing information lineage that is indicative of the veracity of the stored data. For example, in one example, one or more data repositories are maintained. The one or more data repositories comprise metadata representative of the veracity of one or more data sets stored in the one or more data repositories. In response to a query to at least one data set of the one or more data sets stored in the one or more data repositories, a result of the query for the at least one data set is returned in combination with corresponding metadata representing the veracity of the at least one data set.

20 Claims, 6 Drawing Sheets

(56) References Cited

U.S. PATENT DOCUMENTS

| | | | |
|---|---|---|---|
| 2010/0106558 A1* | 4/2010 | Li | G06F 21/316 705/317 |
| 2010/0250867 A1 | 9/2010 | Bettger et al. | |
| 2010/0332530 A1 | 12/2010 | McKelvie et al. | |
| 2011/0047056 A1* | 2/2011 | Overman | G06Q 40/00 705/35 |
| 2011/0153727 A1 | 6/2011 | Li | |
| 2011/0179110 A1 | 7/2011 | Soloway | |
| 2011/0191562 A1 | 8/2011 | Chou et al. | |
| 2011/0231899 A1 | 9/2011 | Puller et al. | |
| 2012/0254115 A1 | 10/2012 | Varadharajan | |
| 2014/0019423 A1 | 1/2014 | Liensberger et al. | |
| 2015/0127660 A1 | 5/2015 | Zilberberg et al. | |
| 2015/0220649 A1* | 8/2015 | Papa | G06F 17/30867 707/722 |
| 2015/0286697 A1* | 10/2015 | Byrne | G06F 17/30663 707/600 |
| 2015/0378788 A1 | 12/2015 | Roese et al. | |
| 2016/0267082 A1* | 9/2016 | Wong | G06F 17/3012 |

OTHER PUBLICATIONS

EMC, "EMC Centera Content—Addressable Storage—Archiving Made Simple, Affordable and Secure," http://www.emc.com/collateral/hardware/data-sheet/c931-emc-centera-cas-ds.pdf, May 2013, 4 pages.

P. Mell et al., "The NIST Definition of Cloud Computing," U.S. Department of Commerce, Computer Security Division, National Institute of Standards and Technology, Special Publication 800-145, Sep. 2011, 7 pages.

P. Banerjee et al., "The Future of Cloud Computing: An HP Labs Perspective," HP Labs Technical Reports, Dec. 2010, 11 pages.

C. Dai et al., "An Approach to Evaluate Data Trustworthiness Based on Data Provenance," Proceedings of the 5th VLDB Workshop on Secure Data Management (SDM '08), Aug. 2008, pp. 82-98.

P. De Leusse et al., "Toward Governance of Cross-Cloud Application Deployment," Second Optimising Cloud Services Workshop, Mar. 2012, 12 pages.

A. Gehani et al., "Mendel: Efficiently Verifying the Lineage of Data Modified in Multiple Trust Domains," Proceedings of the 19th ACM International Symposium on High Performance Distributed Computing (HPDC '10), Jun. 2010, 13 pages.

M.T. Jones, "Anatomy of a Cloud Storage Infrastructure," http://www.ibm.com/developerworks/cloud/library/cl-cloudstorage, Nov. 2010, 7 pages.

P. Mell et al., "The NIST Definition of Cloud Computing," U.S. Department of Commerce, Computer Security Divison, National Institute of Standards and Technology, Special Publication 800-145, Sep. 2011, 7 pages.

S. Pearson, "Privacy, Security and Trust in Cloud Computing," HP Labs Technical Reports, Jun. 2012, pp. 1-57.

U.S. Appl. No. 14/674,218, filed in the name of Nikhil Sharma et al. on Mar. 31, 2015 and entitled "Use of Trust Characteristics of Storage Infrastructure in Data Repositories."

U.S. Appl. No. 14/744,886, filed in the name of Marina Zeldin et al. Jun. 19, 2015 and entitled "Infrastructure Trust Index."

* cited by examiner

LINEAGE-BASED VERACITY FOR DATA REPOSITORIES

FIELD

The field relates generally to data repositories, and more particularly to determining and representing the veracity of data stored in a data repository and results of queries directed to the stored data.

BACKGROUND

One example of a data repository is a "data lake." A data lake is a centralized data storage system for structured and unstructured data. The data in the data lake can originate from a diverse variety of data sources. A data lake can, by way of example, facilitate agile business queries that advantageously leverage the diverse variety of data sources in order to produce business insight.

However, since data in a data lake can come from a diverse variety of data sources, this can be a problem given that the data from one or more of the sources could be inaccurate. As such, query results generated against such data may not be trustworthy. This could have disadvantageous ripple effects, for example, for a chief data officer whose reputation (and perhaps the reputation of the company) may be tied to the correctness of data-based decisions. In addition, there are other entities outside of the business domain (e.g. regulators) that can levy additional penalties for use of incorrect data.

SUMMARY

Embodiments of the invention provide techniques for determining and representing the veracity of data stored in a data repository and results of queries directed to the stored data by utilizing information lineage that is indicative of the veracity of the stored data.

For example, in one embodiment, one or more data repositories are maintained. The one or more data repositories comprise metadata representative of the veracity of one or more data sets stored in the one or more data repositories. In response to a query to at least one data set of the one or more data sets stored in the one or more data repositories, a result of the query for the at least one data set is returned in combination with corresponding metadata representing the veracity of the at least one data set.

Advantageously, such metadata may include one or more veracity scores indicative of the veracity of the stored data. Given the ability of a data scientist or data architect to know the veracity score of a given data set within a data lake, they have a framework for creating trusted queries/models based on the given data set.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," and the like as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" generally refers to one or more software programs designed to perform one or more functions; "metadata" generally refers to data that describes or defines other data; and "trusted" generally means satisfying (or at least substantially satisfying) or being consistent with one or more trust-based criteria (e.g., policies, requirements, regulations, etc.) or possessing one or more trust attributes (e.g., retention-capable, encryption, immutability, etc.), e.g., as in trusted infrastructure. Examples of metadata that is used and generated in accordance with embodiments of the invention include, but are not limited to, lineage information and veracity scores, as will be explained in detail herein.

As will be explained in detail herein, illustrative embodiments provide techniques that enable determining which portions of a data lake come from trusted and/or verified sources, as well as enable the capability to look at a singular data source and conclude which portions (or percentages) are trusted/verified. Furthermore, for any given query across multiple data sources in a data lake, illustrative embodiments can give a percent confidence that the query result is trusted/verified. Illustrative embodiments, upon ingest into a data lake, measure the veracity of the incoming data, and subsequently associate that portion of the data lake with veracity metadata. After ingest into a data lake, illustrative embodiments validate that subsequent queries are not using verified data sources that have been somehow tampered with or altered since ingest (thus jeopardizing the veracity of the results).

In accordance with illustrative embodiments, the above and other advantages, features, and functionalities are achieved by applying data lineage techniques in the context of data repositories such as a data lake and/or a metadata lake. A "metadata lake" is a data lake that stores (mostly or exclusively) metadata.

The use of lineage in a data lake context provides the ability to validate the data sources that contribute to a data query. It is to be appreciated that while illustrative embodiments are described herein in the context of data lakes, the lineage-based veracity techniques described herein can also be applied to other types of data repositories including, but not limited to, data warehouses and/or data marts.

As will be described in further detail herein, data sets that are being ingested into a data lake are examined to discover lineage information pertaining to and/or including, but not limited to: (i) ancestry (e.g., pointers to ancestral/descendant content); (ii) signatures/timestamps; (iii) retention; (iv) hash values; and (v) immutability. Other trust attributes may be used such as, by way of example only, encryption, username/password, keys, etc.

For those data sets that are being ingested into a data lake, without lineage information, the data set can be placed onto a lineage-capable storage system or a trusted infrastructure, so that going forward the data set begins to track the lineage information (trust attributes) mentioned above.

Upon extraction of the lineage information described above, these trust attributes are stored in an additional location (e.g., a metadata lake) and associated with the ingested data set.

Once data sets within a data lake have been associated with lineage information, a veracity score can be calculated for each data set. "Veracity" generally refers to truth or accuracy. Thus, a "veracity score" is a metric or statistic that represents the accuracy of data and thus the trustworthiness of the data. By way of one example only, a veracity score can be a number between 0-N, where N is the number of trust attributes that are being employed by the system, such that a ranking of N means that all N trust attributes are present for a data set, while a ranking of 0 means that none of the N attributes are present. Therefore, assuming in one example that the veracity score range/ranking is from 0-5 given that there are five trust attributes, a score of 5 means that all five trust attributes are present, while a score of 0 means that no trust attributes are present.

Once data sets within a data lake have been associated with veracity scores, a listing of all data sets and their associated veracity scores can be calculated. In addition, the overall trustworthiness of a data lake can be determined as well, i.e., a composite veracity is computed by summing, averaging or otherwise statistically combining the veracity scores of data sets in the data lake.

Given the ability of a data scientist or data architect to measure the veracity score of a given data set within a data lake, they now have a framework for creating trusted queries/models based on those data sets. The results of these queries can generate a "trustworthiness" result (e.g., where the range/ranking is from 0-5, the veracity scores across all data sets is 3.5 out of 5).

Furthermore, a percent confidence measure can also be calculated by taking a computed veracity score and dividing it by the highest veracity score possible. By way of example only, a data set with a computed veracity score of 4 out of a possible 5 (⅘) yields an 80% confidence measure.

Given the ability of a data scientist or data architect to determine whether or not a given data set has immutability characteristics (e.g., the data cannot be altered/tampered with), the data scientist/architect can create queries that can be provided to a third party (e.g., a regulator) as "auditable," meaning that should the third party wish to audit the results, the query can be re-run and guaranteed to produce the same results.

Illustrative embodiments will now be described in the context of FIGS. 1-7.

Figure 1:
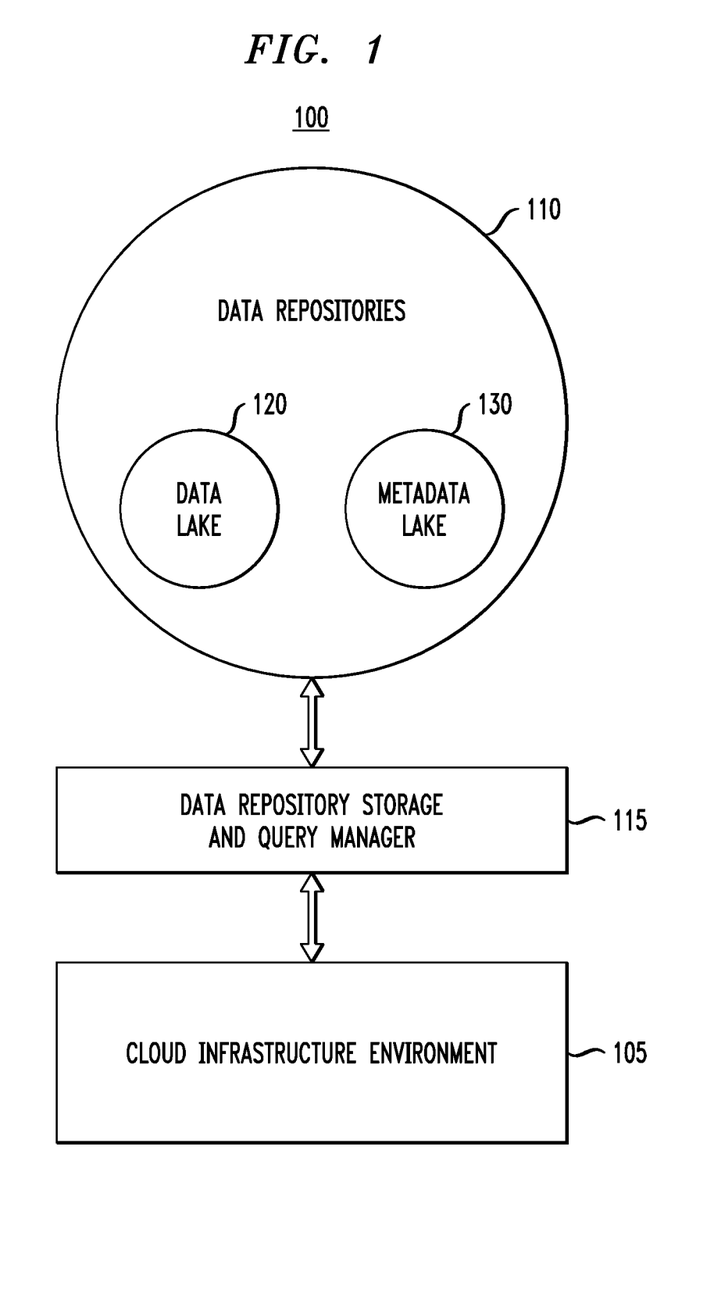
FIG. 1 illustrates a data repository and cloud infrastructure environment in which lineage-based veracity techniques are implemented, according to an embodiment of the invention.

FIG. 1 illustrates a data repository and cloud infrastructure environment in which lineage information and veracity scores are implemented, according to an embodiment of the invention. As shown in system 100, a cloud infrastructure environment 105 is operatively coupled to data repositories 110 through a data repository storage and query manager 115. The data repositories 110 include a data lake 120 and a metadata lake 130.

It is to be appreciated that the phrase "cloud infrastructure environment" as illustratively used herein generally refers to an environment that comprises computing resources and applications that are hosted thereon. The cloud infrastructure in one illustrative embodiment comprises an infrastructure-as-a-service (IaaS) approach with a plurality of clouds that form a plurality of data centers (e.g., software defined data centers or SDDCs).

Figure 2:
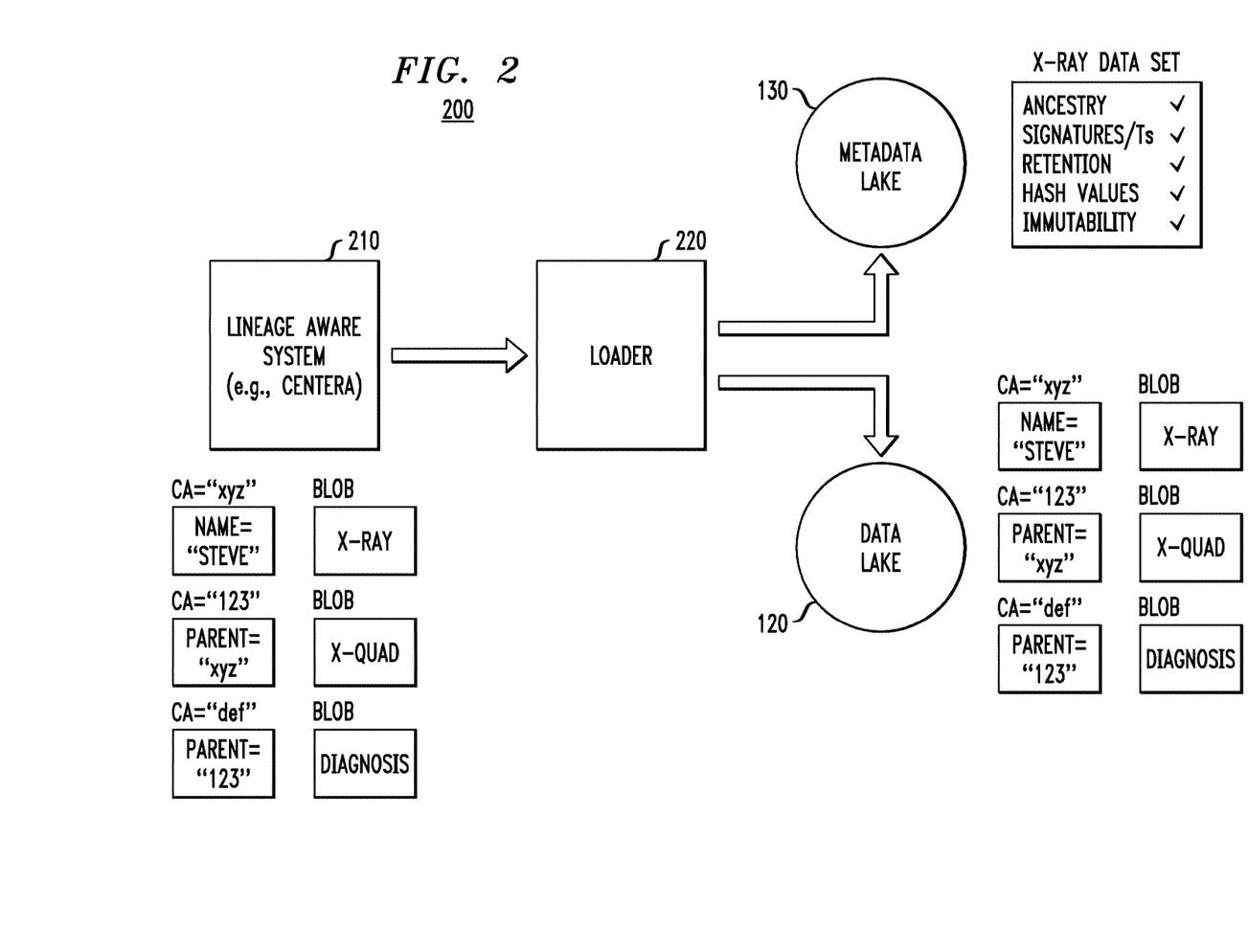
FIG. 2 illustrates a lineage aware embodiment of the data repository environment of FIG.
Figure 3:
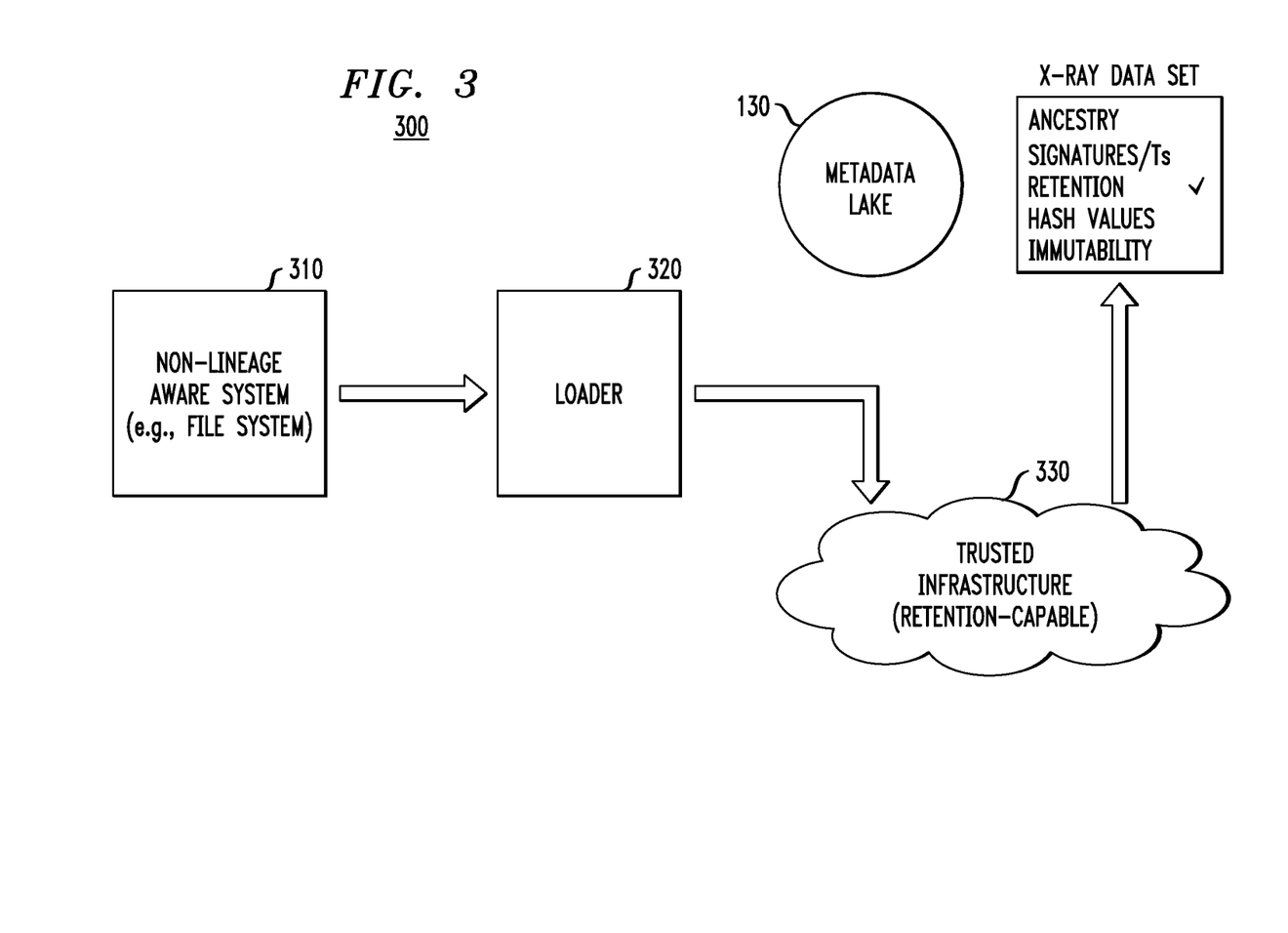
FIG. 3 illustrates a non-lineage aware embodiment of the data repository environment of FIG. 1.

The data repository storage and query manager 115, as will be further described herein, determines and represents the veracity of data stored in data repositories 110 and results of queries directed to the stored data using lineage information in the form of trust attributes. Data lake 120 stores the content (data sets) and metadata lake 130 stores the lineage information and veracity scores. FIGS. 2 and 3 will illustrate how the data repository storage and query manager 115 operates when the cloud infrastructure environment 105 includes a lineage aware system (FIG. 2) and/or a non-lineage aware system (FIG. 3) as data sources for data to be stored in data repositories 110.

As shown in environment 200 in FIG. 2, a lineage aware system 210 provides data (one or more data sets) to a loader 220. The loader 220 directs the data set(s) to data lake 120 for storage and extracts metadata associated with the data set(s) and directs the metadata to metadata lake 130. With reference back to FIG. 1, lineage aware system 210 is considered part of cloud infrastructure environment 105, loader 220 is considered part of data repository storage and query manager 115, and data lake 120 and metadata lake 130 are considered part of data repositories 110.

One example of a lineage aware system is the Centera system (commercially available from EMC Corporation, Hopkinton, Mass.). The Centera system is a content-addressable storage (CAS) platform for providing data archiving functionality. The Centera system is "lineage aware" in the sense that it is designed to provide capabilities/functionality including: (i) ancestry (e.g., pointers to ancestral/descendant content); (ii) signatures/timestamps; (iii) retention; (iv) hash values; and (v) immutability. In this illustrative embodiment, it is assumed that the lineage aware system is a Centera system; however, alternate systems may be implemented.

In this example, assume that a piece of content (e.g., Blob with a content address or CA="def") is a medical diagnosis that was made based on a software analysis of an X-ray quadrant (Blob with a CA="123"), which was based on an original X-ray of patient "steve" (Blob with a CA="xyz"). The Centera system permanently binds content (e.g., the blobs) to content descriptor files ("CDFs") referenced via unique addresses (a hash-based content address or CA) and metadata about the content (e.g., specifying which blob is the parent to another blob, for example, indicating that Blob "xyz" is the parent of Blob "123" which is the parent of Blob "def"). All data is time stamped, and all data is immutable (e.g., overwriting or appending creates a separate blob or CDF while the original remains unaltered).

Such an "X-ray data set" is shown in FIG. 2 as being archived in lineage aware system 210. Now assume that this data set is to be streamed into data lake 120. Loader 220 is configured to recognize and extract the lineage information (i.e., metadata that includes ancestry, signatures/timestamps, retention capabilities, hash values (CAs) and immutability characteristics of the Centera system) associated with the data set, and to store the metadata in metadata lake 130 associated with the actual data lake content. Now that the lineage has been recognized for this data set, the system can measure the veracity of the data and queries because, for example, the descendancy and immutability of the data set is well-known. A detailed description of how the veracity can be measured and represented (as veracity scores) will be explained below.

FIG. 3 illustrates an embodiment where the data source is not lineage aware (non-lineage aware). As shown in embodiment 300 in FIG. 3, a non-lineage aware system 310 provides data (one or more data sets) to a loader 320. In one example, the system 310 is a file system. Since the system 310 does not provide any lineage type metadata with the data set(s) and thus the loader 320 cannot recognize or extract any such lineage metadata, the loader 320 can choose to direct the incoming content (data set) for storage to a trusted infrastructure 330 that possesses a trust attribute such as "retention." The trusted infrastructure can then provide metadata lake 130 with metadata indicating that it (i.e., the trusted infrastructure, itself) is retention-capable, and the metadata lake 130 then associates that one trust attribute (retention) with the data set(s) that is stored on the trusted infrastructure. Retention-capable or retention generally means that the system retains data in accordance with some retention policy or retention requirement. With reference back to FIG. 1, non-lineage aware system 310 is considered part of cloud infrastructure environment 105, loader 320 is considered part of data repository storage and query manager 115, the metadata lake 130 is considered part of data repositories 110, and the trusted infrastructure 330 may be considered part of the cloud infrastructure environment 105 or part of the data repositories 110.

It is to be appreciated that selection of a trusted infrastructure and subsequent storage of metadata about the infrastructure can be performed in accordance with techniques described in U.S. Ser. No. 14/610,191 filed on Jan. 30, 2015 and entitled "Governed Application Deployment on Trusted Infrastructure," the disclosure of which is incorporated by reference in its entirety herein. However, other trusted infrastructure selection and infrastructure metadata techniques can be employed in accordance with other illustrative embodiments of the invention.

Figure 4:
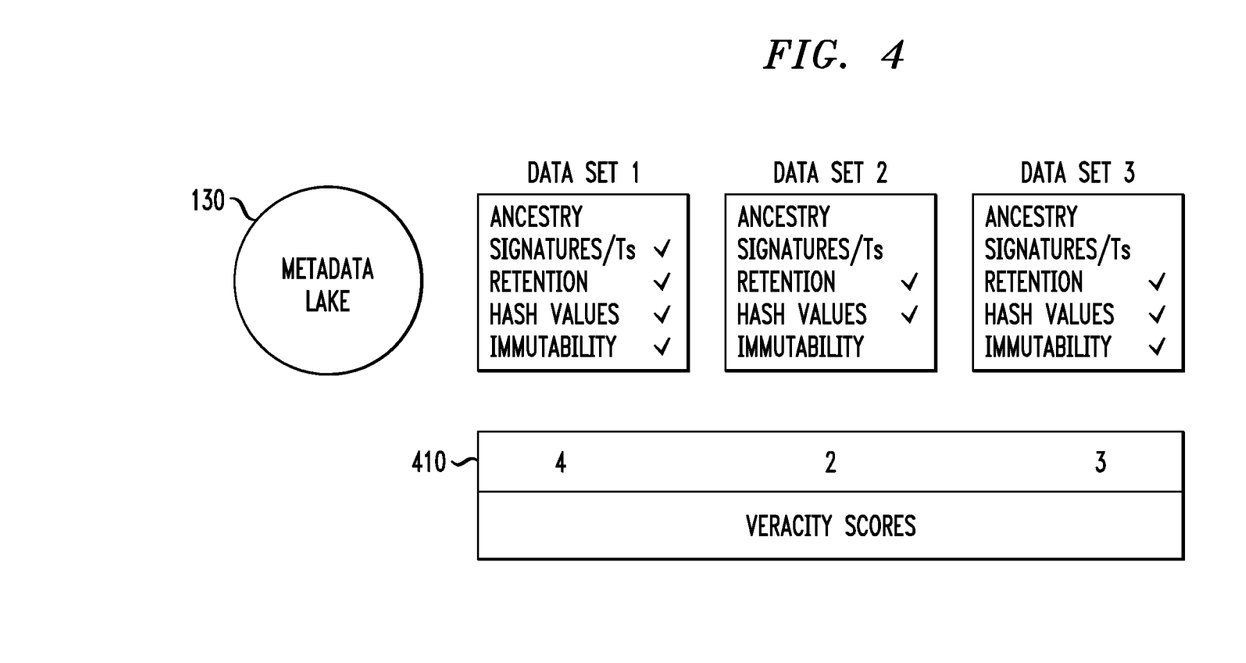
FIG. 4 illustrates the concept of veracity scores, according to an embodiment of the invention.

FIG. 4 illustrates the concept of veracity scores, according to an embodiment of the invention. As shown in the example of FIG. 4, metadata lake 130 is configured to associate and store five trust attributes for each of three data sets: Data Set 1, Data Set 2, and Data Set 3 (wherein each data set is stored in data lake 120). In one illustrative embodiment, these trust attributes are: (i) ancestry; (ii) signatures/timestamps; (iii) retention; (iv) hash values; and (v) immutability. As indicated, Data Set 1 has all trust attributes except ancestry (thus 4 trust attributes), Data Set 2 has only retention and hash values (thus 2 trust attributes), and Data Set 3 has retention, hash values, and immutability (thus 3 trust attributes). Assuming that the presence of each trust attribute has a value of 1, then a veracity score is computed for each data set as the addition of the values of the trust attribute present for that data set. Therefore, since Data Set 1 has 4 trust attributes, its veracity score is 4. Accordingly, Data Set 2 has a veracity score of 2, and Data Set 3 has a veracity score of 3. These veracity score 410 are shown in FIG. 4. Note that the data repository storage and query manager 115 computes these scores for each data set. The scores are stored in metadata lake 130 along with the other metadata for each data set.

Alternative methods for computing the veracity scores may be implemented. By way of further example only, a customer may wish to "weight" one trust attribute more highly than another. For example, if the loader senses that "immutability" is present, they may wish to double the weight of that attribute as compared to the others (e.g., assign a value of "2" as opposed to "1"). Similarly, for each trust attribute (e.g., retention), the loader may note that there are different levels of retention capability possible, e.g., vanilla retention, event-based retention (events can trigger changes in retention lengths), and/or retention classes (using a variable name to keep track of retention lengths). If all three of these are present, the score for retention would be "3". If only one is present, the score would be "1". It is to be appreciated that these are further examples of how the veracity scores may be computed and thus, given the teachings herein, one of ordinary skill in the art will realize other examples.

Advantageously, given the functionality implemented between the loader, metadata lake, and trusted infrastructure, the metadata lake can now maintain these veracity scores. This can allow an organization to respond to business situations such as: (i) Is a given query auditable? Will the data be unchanged if a regulator comes in and asks me to reproduce the results? (ii) How trustworthy is the query result on a scale of 1 to 5? (iii) If I eliminate certain data sets from consideration will my confidence in the result improve? We now describe illustrative embodiments in which the veracity scores are used in accordance with such queries.

Figure 5:
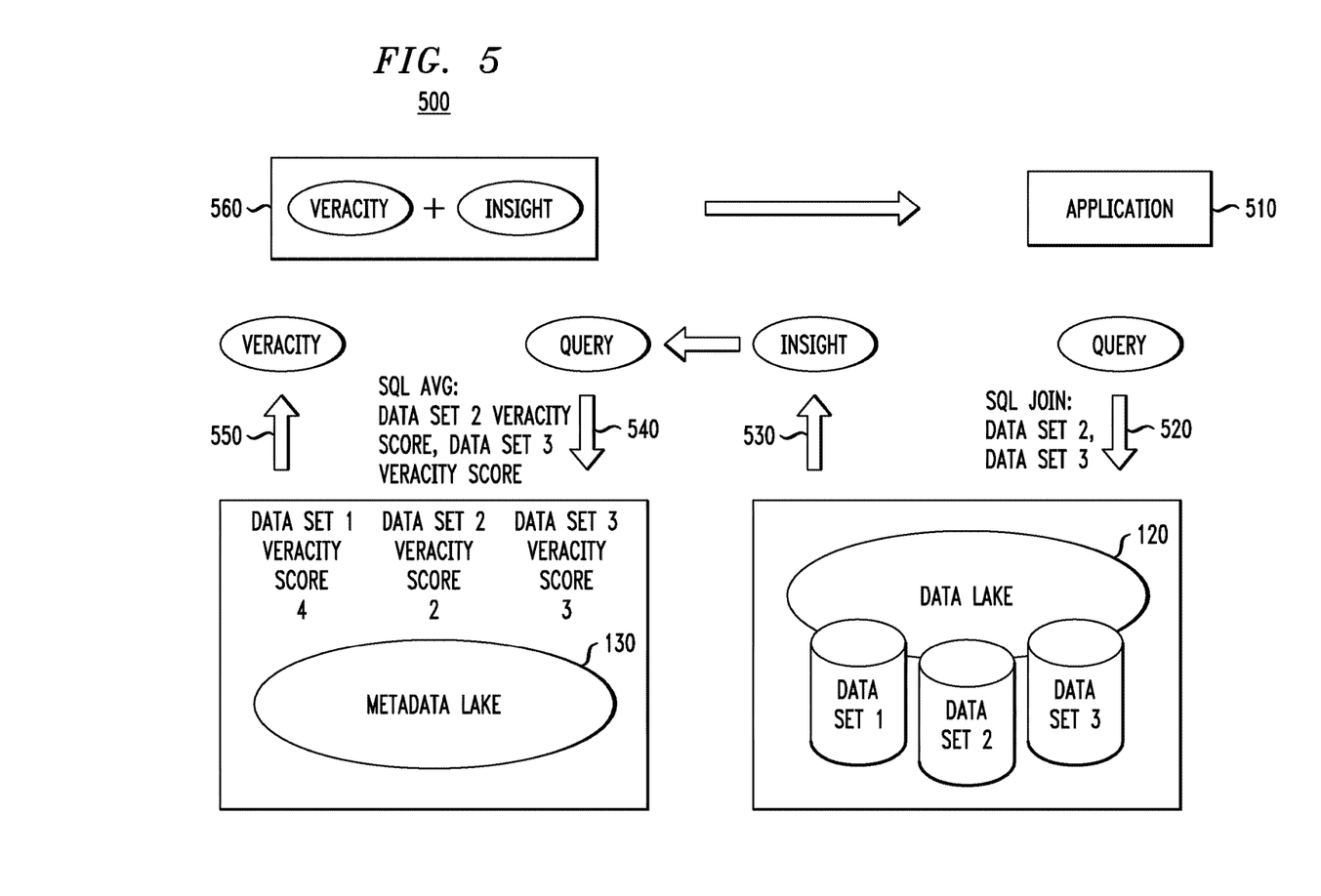
FIG. 5 illustrates a methodology for combining query results with veracity scores, according to an embodiment of the invention.

FIG. 5 illustrates a methodology 500 for combining query results with veracity scores, according to an embodiment of the invention. Given the maintenance of veracity scores for data sets as explained above, an application can now receive "insight and veracity" using the following steps.

Step 510: the application queries Data Sets 2 and 3 (which, in this example, are the data sets illustrated in FIG. 4 and described above).

Step 520: a query (SQL JOIN) is constructed and submitted to data lake 120 (where the data sets are stored). SQL refers to Structured Query Language, and a JOIN is an SQL clause that combines two data sets.

Step 530: results of the query are returned as "insight."

Step 540: a query (SQL AVG) is constructed to discover the trustworthiness of Data Sets 2 and 3. AVG takes the average of two or more data values.

Step 550: a veracity score referred to here simply as "veracity" is returned (given a veracity score of 2 for Data Set 2 and a veracity score of 3 for Data Set 3, the average veracity score returned is 2.5).

Step 560: Veracity and insight (insight referring to the query results of the SQL JOIN) are combined and returned to the application.

It is to be appreciated that queries can be constructed by the data repository storage and query manager 115.

Figure 6:
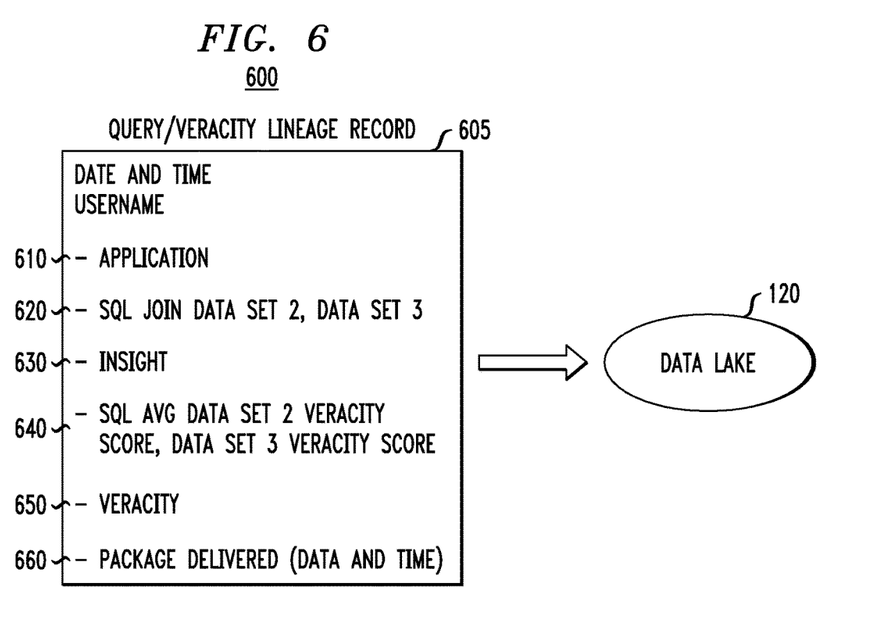
FIG. 6 illustrates a query/veracity lineage record generated according to the methodology of FIG. 5.

As queries and veracity scores are calculated and returned to the application, lineage can be generated for each of the steps above and the entire veracity/insight transaction preserved in order to satisfy auditors and/or comply with local regulations. FIG. 6 illustrates an audit record generation methodology 600 wherein information elements are gathered together and preserved into a data lake 120 for subsequent audits. As shown, query/veracity lineage record 605 includes entries 610 through 660 which respectively correspond to information generated in steps 510 through 560 in FIG. 5. This record 605 is then stored in data lake 120 (or it could be stored in metadata lake 130). It is to be appreciated that the audit record can be generated by data repository storage and query manager 115.

Assume that an auditor makes a request: "show me that the application report you generated on a certain date is authentic." This would result in a query for that application name and date range. These two values can then be used to search for the lineage record 605. As this lineage record is returned to the auditor, it too could have a checksum on it that proves that the record has not been tampered with, further proving compliance.

Figure 7:
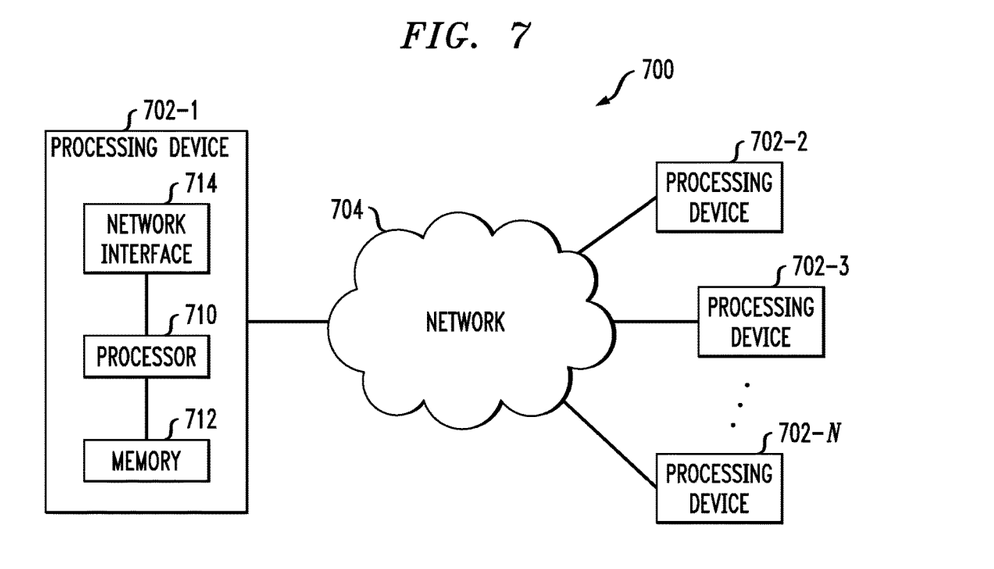
FIG. 7 illustrates a processing platform used to implement a data repository and cloud infrastructure environment in which lineage-based veracity techniques are implemented, according to an embodiment of the invention.

As an example of a processing platform on which a data repository and cloud infrastructure environment (e.g., 100 in FIG. 1) can be implemented is processing platform 700 shown in FIG. 7. The processing platform 700 in this embodiment comprises a plurality of processing devices, denoted 702-1, 702-2, 702-3, . . . 702-N, which communicate with one another over a network 704. It is to be appreciated that the lineage-based veracity methodologies described herein may be executed in one such processing device 702, or executed in a distributed manner across two or more such processing devices 702. The cloud infrastructure environment may also be executed in a distributed manner across two or more such processing devices 702. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the data repository and cloud infrastructure environment collectively shown as 100 in FIG. 1 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 700 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the system environment 100 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   maintaining a set of repositories, wherein the set of repositories comprises a data repository for storing one or more data sets and a metadata repository for storing metadata representative of the veracity of the one or more data sets stored in the data repository; wherein a cloud infrastructure environment is operatively coupled to the set of data repositories, wherein the maintaining step further comprises:
   obtaining a first portion of the one or more data sets from a lineage aware data source of the cloud infrastructure environment and storing the first portion of the one or more data sets in the data repository;
   obtaining a second portion of the one or more data sets from a non-lineage aware data source of the cloud infrastructure environment and storing the second portion of the one or more data sets in a trusted infrastructure portion of the data repository;
   wherein the metadata representing the veracity of the one or more data sets comprises one or more veracity scores generated based on one or more trust attributes associated with the one or more data sets, and wherein the one or more trust attributes of the one or more data sets correspond to lineage information associated with the one or more data sets, and further wherein the lineage information for a given data set of the second portion of the one or more data sets is attributable to the trusted infrastructure upon which the given data set is stored after being obtained from the non-lineage aware data source; and
   in response to a query to at least one data set of the one or more data sets stored in the set of data repositories, returning a result of the query for the at least one data set in combination with corresponding metadata representing the veracity of the at least one data set.

2. The method of claim 1, wherein the lineage information for a given data set of the first portion of the one or more data sets is attributable to a lineage aware data source from which the given data set was obtained prior to storage in the set of repositories.

3. The method of claim 1, further comprising preserving a record of the result of the query and the corresponding metadata representing the veracity of the at least one data set.

4. The method of claim 3, further comprising presenting the record in response to an audit request.

5. The method of claim 1, wherein the metadata stored in the metadata repository is representative of the composite veracity of the one or more data sets stored in the data repository.

6. The method of claim 5, wherein the composite veracity is computed by statistically combining the veracity scores of one or more data sets in the data repository.

7. The method of claim 5, further comprising computing a percent confidence measure for at least one data set by dividing a computed veracity score for the at least one data set by the highest possible veracity score.

8. An article of manufacture comprising a processor-readable storage medium having encoded therein executable code of one or more software programs, wherein the one or more software programs when executed by one or more processing devices implement the steps of:
   maintaining a set of repositories, wherein the set of repositories comprises a data repository for storing one or more data sets and a metadata repository for storing metadata representative of the veracity of the one or more data sets stored in the data repository; wherein a cloud infrastructure environment is operatively coupled to the set of data repositories, wherein the maintaining step further comprises:
   obtaining a first portion of the one or more data sets from a lineage aware data source of the cloud infrastructure environment and storing the first portion of the one or more data sets in the data repository;
   obtaining a second portion of the one or more data sets from a non-lineage aware data source of the cloud infrastructure environment and storing the second portion of the one or more data sets in a trusted infrastructure portion of the data repository;
   wherein the metadata representing the veracity of the one or more data sets comprises one or more veracity scores generated based on one or more trust attributes associated with the one or more data sets, and wherein the one or more trust attributes of the one or more data sets correspond to lineage information associated with the one or more data sets, and further wherein the lineage information for a given data set of the second portion of the one or more data sets is attributable to the trusted infrastructure upon which the given data set is stored after being obtained from the non-lineage aware data source; and
   in response to a query to at least one data set of the one or more data sets stored in the set of data repositories, returning a result of the query for the at least one data set in combination with corresponding metadata representing the veracity of the at least one data set.

9. The article of manufacture of claim 8, wherein the one or more software programs when executed by one or more processing devices implement preserving a record of the result of the query and the corresponding metadata representing the veracity of the at least one data set.

10. The article of manufacture of claim 9, wherein the one or more software programs when executed by one or more processing devices implement presenting the record in response to an audit request.

11. The article of manufacture of claim 8, wherein the metadata stored in the metadata repository is representative of the composite veracity of the one or more data sets stored in the data repository.

12. The article of manufacture of claim 8, wherein the lineage information for a given data set of the first portion of the one or more data sets is attributable to a lineage aware data source from which the given data set was obtained prior to storage in the set of repositories.

13. The article of manufacture of claim 11, further comprising computing a percent confidence measure for at least one data set by dividing a computed veracity score for the at least one data set by the highest possible veracity score.

14. A system comprising:
one or more processors operatively coupled to one or more memories configured to:
maintain a set of repositories, wherein the set of repositories comprises a data repository for storing one or more data sets and a metadata repository for storing metadata representative of the veracity of the one or more data sets stored in the data repository; wherein a cloud infrastructure environment is operatively coupled to the set of data repositories, wherein the maintaining step further comprises:
obtaining a first portion of the one or more data sets from a lineage aware data source of the cloud infrastructure environment and storing the first portion of the one or more data sets in the data repository;
obtaining a second portion of the one or more data sets from a non-lineage aware data source of the cloud infrastructure environment and storing the second portion of the one or more data sets in a trusted infrastructure portion of the data repository;
wherein the metadata representing the veracity of the one or more data sets comprises one or more veracity scores generated based on one or more trust attributes associated with the one or more data sets, and wherein the one or more trust attributes of the one or more data sets correspond to lineage information associated with the one or more data sets, and further wherein the lineage information for a given data set of the second portion of the one or more data sets is attributable to the trusted infrastructure upon which the given data set is stored after being obtained from the non-lineage aware data source; and
in response to a query to at least one data set of the one or more data sets stored in the set of data repositories, return a result of the query for the at least one data set in combination with corresponding metadata representing the veracity of the at least one data set.

15. The system of claim 14, wherein the lineage information for a given data set of the first portion of the one or more data sets is attributable to a lineage aware data source from which the given data set was obtained prior to storage in the set of repositories.

16. The system of claim 14, wherein the one or more processors are further configured to preserve a record of the result of the query and the corresponding metadata representing the veracity of the at least one data set.

17. The system of claim 16, wherein the one or more processors are further configured to present the record in response to an audit request.

18. The system of claim 14, wherein the metadata stored in the metadata repository is representative of the composite veracity of the one or more data sets stored in the data repository.

19. The system of claim 18, wherein the composite veracity is computed by statistically combining the veracity scores of one or more data sets in the data repository.

20. The system of claim 14, further comprising computing a percent confidence measure for at least one data set by dividing a computed veracity score for the at least one data set by the highest possible veracity score.

* * * * *